US012680009B2

(12) United States Patent
Park et al.

(10) Patent No.: US 12,680,009 B2
(45) Date of Patent: Jul. 14, 2026

(54) HEAT TRANSFER FLUID COMPOSITION WITH IMPROVED THERMAL STABILITY

(71) Applicant: KD FINECHEM CO., LTD., Busan (KR)

(72) Inventors: Jae Yoon Park, Seoul (KR); Hyun Jin Park, Seongnam-si (KR); Hong Ki Lee, Busan (KR); Ja Won Kim, Busan (KR); Sang Jun Yoon, Busan (KR)

(73) Assignee: KD FINECHEM CO., LTD., Busan (KR)

( * ) Notice: Subject to any disclaimer, the term of this patent is extended or adjusted under 35 U.S.C. 154(b) by 611 days.

(21) Appl. No.: 18/032,671

(22) PCT Filed: Jul. 15, 2021

(86) PCT No.: PCT/KR2021/009106
§ 371 (c)(1),
(2) Date: Apr. 19, 2023

(87) PCT Pub. No.: WO2022/092491
PCT Pub. Date: May 5, 2022

(65) Prior Publication Data
US 2023/0383160 A1    Nov. 30, 2023

(30) Foreign Application Priority Data
Oct. 29, 2020    (KR) ........................ 10-2020-0142462

(51) Int. Cl.
*C09K 5/10*    (2006.01)

(52) U.S. Cl.
CPC ...................................... *C09K 5/10* (2013.01)

(58) Field of Classification Search
CPC ........................................................ C09K 5/10
See application file for complete search history.

(56) References Cited

U.S. PATENT DOCUMENTS

| 4,450,088 A | 5/1984 | Wilson et al. | |
| 2003/0164470 A1* | 9/2003 | Wenderoth | C23F 11/164 |
| | | | 252/75 |
| 2005/0244692 A1* | 11/2005 | Egawa | H01M 8/04253 |
| | | | 429/437 |

FOREIGN PATENT DOCUMENTS

| KR | 10-2001-0087263 A | 9/2001 |
| KR | 10-2006-0031872 A | 4/2006 |
| KR | 10-0771966 B1 | 11/2007 |
| KR | 10-2011-0139012 A | 12/2011 |
| WO | 2020/094427 A1 | 5/2020 |

OTHER PUBLICATIONS

International Search Report for PCT/KR2021/009106 dated Feb. 3, 2022.

* cited by examiner

*Primary Examiner* — Peter F Godenschwager
(74) *Attorney, Agent, or Firm* — Sughrue Mion, PLLC

(57)    ABSTRACT

The present invention relates to a heat transfer fluid composition with improved thermal stability, and has the effect of inhibiting the oxidation of a coolant due to hydrogen vehicle stack cooling system components and operating temperature.

6 Claims, No Drawings

HEAT TRANSFER FLUID COMPOSITION WITH IMPROVED THERMAL STABILITY

CROSS REFERENCE TO RELATED APPLICATIONS

This patent application is a National Stage of International Application No. PCT/KR2021/009106 filed Jul. 15, 2021, claiming priority based on Korean Patent Application No. 10-2020-0142462 filed with the Korean Intellectual Property Office on Oct. 29, 2020, the disclosure of which is incorporated herein by reference.

Technical Field

The present disclosure relates to a heat transfer fluid composition with improved thermal stability.

BACKGROUND ART

Heat transfer fluids (e.g., coolants) for internal combustion engines generally contain 50% by weight of water and 50% by weight of ethylene glycol, and trace amounts of additives such as corrosion inhibitors. However, internal combustion engines are likely to become obsolete in the coming decades as fuel cells emerge as potential replacements.

In general, a fuel cell is an electrochemical device that converts chemical energy of fuel into electrical energy. Fuel cells offer several advantages over internal combustion engines. Fuel cells are more efficient in extracting energy from fuel. For example, efficiency is measured to be 40% for a turbo diesel engine, 30% for a gasoline engine, and 60 to 70% for fuel cells In addition, fuel cells are quiet and emit a negligible level of pollutants. Furthermore, since the main fuel source for fuel cells is hydrogen, it is more readily available than gasoline used as a fuel source for internal combustion engines. However, the replacement of an internal combustion engine with a fuel cell naturally requires the change of the conventional heat transfer fluid.

A fuel cell consists typically of an anode, a cathode, and an electrolyte disposed between the two electrodes. Each electrode is coated with a catalyst layer. At the anode, a fuel such as hydrogen is catalytically converted to form cations which move through the electrolyte to the cathode. At the cathode, an oxidizing agent such as oxygen reacts with the catalyst layer to form anions. The reaction between anions and cations produces reaction products, electricity, and heat.

The current generated by the fuel cell is proportional to the size (area) of the electrode. As a rule, a single fuel cell generates a relatively small voltage (about 1 volt). To produce a higher voltage, several fuel cells must be connected in series or parallel (e.g., stacked) along the bipolar plates that separate adjacent fuel cells. As used herein, a fuel cell assembly refers to an individual fuel cell. The most common fuel and oxidizer used in fuel cells are hydrogen and oxygen, respectively. In this fuel cell, the reactions occurring at the anode and cathode are represented by the following reaction equations:

$$\text{Reaction at anode: } H_2 \rightarrow H^+ + 2e^- \quad (1)$$

$$\text{Reaction at cathode: } \tfrac{1}{2}O_2 + 2H^+ + 2e^- \rightarrow H_2O \quad (2)$$

Oxygen used in fuel cells comes from air. Hydrogen used herein may be in the form of hydrogen gas or reformed hydrogen. Reformed hydrogen is produced by a reformer, an optional component of the fuel cell assembly, in which hydrocarbon fuels (e.g., methanol, natural gas, gasoline, etc.) are converted to hydrogen. The reforming reaction produces heat as well as hydrogen. Currently, there are five types of fuel cells according to the electrolyte (solid or liquid), operating temperature, and fuel preference.

These types of fuel cells include proton exchange membrane fuel cells ("PEMFC"), phosphoric acid fuel cells ("PAFC"), molten carbonate fuel cells ("MCFC"), solid oxide fuel cells ("SOFC"), and alkaline fuel cells ("AFC").

PEMFCs, also known as polymer electrolyte membrane fuel cells, use an ion exchange membrane as the electrolyte. The membrane allows only protons to pass between the cathode and anode. For PEMFCs, hydrogen fuel is introduced into the anode and catalytically oxidized to release electrons and form protons. Electrons move in the form of a current to the cathode along the external circuit. At the same time, the protons diffuse along the membrane to the cathode, where they react with oxygen to produce water, which eventually completes the whole process. PEMFCs operate at relatively low temperatures (about 200° F.), and this type of fuel cell has the disadvantage of being sensitive to impurities in the fuel.

PAFC uses phosphoric acid as an electrolyte. PAFCs have an operating temperature range of about 300 to 400° F. Unlike PEMFCs, PAFCs are not sensitive to impurities in fuel. There is a wide range of fuel options available in this sense. However, PAFCs have several drawbacks. One of them is that PAFCs use an expensive catalyst (platinum). Another disadvantage is the low current and power, compared to other types of fuel cells. Also, PAFCs are generally large in size and weight.

MCFC uses a carbonate of alkali metals, such as Li+, Na+, or K+, as an electrolyte. In order for alkali metal carbonate to function as an electrolyte, it must be in a liquid form. As a result, MCFCs operate at temperatures around 1200° F. This high operating temperature is necessary to obtain sufficient conductivity of the electrolyte. This allows greater flexibility in fuel selection (e.g., reformed hydrogen) but at the same time increases corrosion and failure of cell components.

SOFC uses a solid non-porous metal oxide as an electrolyte rather than a liquid electrolyte. SOFCs, like MCFCs, operate at high temperatures of about 700 to 1000° C. (i.e., 1830° F.). SOFC's high operating temperature has the same advantages and disadvantages as in MCFC's. An additional advantage of SOFCs lies in the solid-state properties of the electrolyte, which removes restrictions on the shape of the fuel cell assembly (e.g., SOFCs can be designed in a plate or tube shape).

Finally, an alkaline fuel cell, known as AFC, uses an aqueous solution of alkaline potassium hydroxide as the electrolyte. Its operating temperature is about 150-200° C. (about 300-400° F.). The advantage of AFC is that the cathodic reaction is faster with alkaline electrolytes than with acidic electrolytes. However, AFCs are prone to contamination and require pure reactants such as pure hydrogen and oxygen.

On the whole, reactions occurring within a fuel cell assembly (e.g., electrochemical reactions and reforming reactions) are exothermic reactions. However, the catalysts applied to these reactions are sensitive to heat. In order to perform the reaction optimally, the fuel cell must be maintained at a specific temperature that is almost uniform along individual cells that are integrated. For example, catalysts may be damaged at high temperatures, and ice may form within the fuel cell assembly at low temperatures. Therefore, a heat transfer composition is needed to accommodate these temperature conditions.

DETAILED DESCRIPTION OF THE INVENTION

Technical Problem

Accordingly, the present disclosure aims to provide a heat transfer fluid composition with improved thermal stability.

Technical Solution

The present disclosure relates to a heat transfer fluid composition with improved thermal stability.

Below, a detailed description will be given of the present disclosure.

An aspect of the present disclosure relates to a heat transfer fluid composition with improved thermal stability, the composition comprising:

at least one solvent selected from the group consisting of water, alcohols, glycols, and glycol ethers; and anthra-nilamide.

In the present disclosure, the water may be deionized water, pure distilled water, or secondary distilled water, but is not limited thereto.

In the present disclosure, the water may be contained in an amount of 30 to 70% by weight, 30 to 65% by weight, 30 to 60% by weight, 30 to 55% by weight, 35 to 70% by weight, 35 to 65% by weight, 35 to 60% by weight, 35 to 55% by weight, 40 to 70% by weight, 40 to 65% by weight, 40 to 60% by weight, 40 to 55% by weight, 45 to 70% by weight, 45 to 65% by weight, 45 to 60% by weight, 45 to 55% by weight, for example, 45 to 54% by weight, based on the total weight of the composition, but with no limitations thereto.

So long as it is known in the art, any alcohol can be used in the present disclosure. By way of example, It may be at least one selected from the group consisting of methanol, ethanol, propanol, butanol, furfurol, tetrahydrofurfuryl, ethoxylated furfuryl, ethylene glycol, diethylene glycol, triethylene glycol, 1,2-propylene glycol, 1,3-propylene glycol, dipropylene glycol, butylene glycol, glycerol, mono-ethyl ether of glycerol, dimethyl ether of glycerol, sorbitol, 1,2,6-hexanetriol, trimethylolpropane, and methoxyethanol, but is not limited thereto.

Any glycols that are known in the art may be used in the present disclosure. For example, it may be at least one selected from the group consisting of ethylene glycol, dieth-ylene glycol, triethylene glycol, propylene glycol, 1,3-pro-panediol, 1,3-butanediol, 1,5-pentanediol, and hexylene gly-col, but is not limited thereto.

Any glycol ether may be used in the present disclosure as long as it is known in the art. For example, it may be at least one selected from the group consisting of ethylene glycol monomethyl ether, diethylene glycol monomethyl ether, triethylene glycol monomethyl ether, tetraethylene glycol monomethyl ether, ethylene glycol monoethyl ether, dieth-ylene glycol monoethyl ether, triethylene glycol monoethyl ether, tetraethylene glycol monoethyl ether, ethylene glycol monobutyl ether, diethylene glycol monobutyl ether, trieth-ylene glycol monobutyl ether, and tetraethylene glycol monobutyl ether, but is not limited thereto.

In one embodiment of the present disclosure, the solvent may be ethylene glycol and/or propylene glycol, but is not limited thereto.

In the present disclosure, at least one selected from the group consisting of alcohols, glycols and glycol ethers may be contained in an amount of 30 to 70% by weight, 30 to 65% by weight, 30 to 60% by weight, to 55% by weight, 35 to 70% by weight, 35 to 65% by weight, 35 to 60% by weight, 35 to 55% by weight, 40 to 70% by weight, 40 to 65% by weight, 40 to 60% by weight, to 55% by weight, 45 to 70% by weight, 45 to 65% by weight, 45 to 60% by weight, 45 to 55% by weight, for example, 45 to 54% by weight, based on the total weight of the composition, but with no limitations thereto.

Anthranilamide in the present disclosure may be con-tained in an amount of 0.001 to 5.0% by weight, 0.001 to 4.0% by weight, 0.001 to 3.0% by weight, 0.001 to 2.0% by weight, 0.001 to 1.0% by weight, 0.01 to 5.0% by weight, 0.01 to 4.0% by weight, 0.01 to 3.0% by weight, to 2.0% by weight, 0.01 to 1.0% by weight, 0.02 to by weight, 0.02 to 4.0% by weight, 0.02 to 3.0% by weight, 0.02 to 2.0% by weight, 0.02 to 1.0% by weight, to 5.0% by weight, 0.03 to 4.0% by weight, 0.03 to 3.0% by weight, 0.03 to 2.0% by weight, 0.03 to 1.0% by weight, 0.04 to 5.0% by weight, 0.04 to 4.0% by weight, to 3.0% by weight, 0.04 to 2.0% by weight, 0.04 to 1.0% by weight, 0.05 to 5.0% by weight, 0.05 to 4.0% by weight, 0.05 to 3.0% by weight, 0.05 to 2.0% by weight, for example, 0.05 to 1.0% by weight, based on the total weight of the composition, but with no limita-tions thereto.

In the present disclosure, the composition may further include a corrosion- and oxidation-resistant agent.

The corrosion- and oxidation-resistant agent in the present disclosure may be at least one selected from the group consisting of azoles, amino acids, and acetamide, but is not limited thereto.

In the present disclosure, the azoles may be triazoles and/or thiadiazoles, but are not limited thereto.

In the present disclosure, the triazoles may be selected from the group consisting of triazole derivatives, benzotri-azole derivatives, and tolutriazole derivatives, but are not limited thereto.

In the present disclosure, examples of the triazoles include N,N-bis(2-ethylhexyl)-4-methyl-1H-benzotriazole-1-methylamine, N,N-bis(2-ethylhexyl)-5-methyl-1H-benzo-triazole-1-methylamine, octyl 1H-benzotriazole, di-tert-butylated 1H-benzotriazole, 1H-1,2,3-triazole, 2H-1,2,3-triazole, 1H-1,2,4-triazole, 4H-1,2,4-triazole, 1-(1', 2'-di-carboxyethyl) benzotriazole, 2-(2'-hydroxy-5'-methyl phenyl) benzotriazole, 1H-1,2,3-triazole, 2H-1,2,3-triazole, 1H-1,2,4-triazole, 4H-1,2,4-triazole, benzotriazole, tolyltri-azole, carboxybenzotriazole, 3-amino-1,2,4-triazole, chlo-robenzotriazole, nitrobenzotriazole, aminobenzotriazole, cyclohexano [1, 2-d] triazole, 4,5,6,7-tetrahydroxytolyltri-azole, 1-hydroxybenzotriazole, ethyl benzotriazole, naph-thotriazole, 1-[N,N-bis(2-ethylhexyl)aminomethyl]benzo-triazole, 1-[N,N-bis(2-ethylhexyl) aminomethyl] tolyltriazole, 1-[N,N-bis(2-ethylhexyl) aminomethyl] carboxybenzotriazole, 1-[N,N-bis(di-(ethanol)-aminomethyl]benzotriazole, 1-[N,N-bis(di-(ethanol)-aminomethyl]tolyltriazole, 1-[N,N-bis(di-(ethanol)-aminomethyl]carboxybenzotriazole, 1-[N,N-bis(2-hydroxypropyl) aminomethyl]carboxybenzotriazole, 1-[N,N-bis(1-butyl) aminomethyl]carboxybenzotriazole, 1-[N,N-bis(1-octyl) aminomethyl]carboxybenzotriazole, 1-(2', 3'-di-hydroxy propyl) benzotriazole, 1-(2', 3'-di-carboxyethyl) benzotriazole, 2-(2'-hydroxy-3',5'-di-tert-butyl phenyl) ben-zotriazole, 2-(2'-hydroxy-3',5'-di-tert-amylphenyl) benzotri-azole, 2-(2'-hydroxy-4'-octoxyphenyl) benzotriazole, 2-(2'-hydroxy-5'-tert-butyl phenyl) benzotriazole, 1-hydroxybenzotriazole-6-carboxylic acid, 1,2,4-triazol-3-ol, 3-amino-5-phenyl-1,2,4-triazole, 3-amino-5-heptyl-1,2,4-triazole, 3-amino-5-(4-isopropyl-phenyl)-1,2,4-triazole, 5-amino-3-mercapto-1,2,4-triazole, 3-amino-5-(p.tert-butylphenyl)-1,2,4-triazole, 5-amino-1,2,4-triazole-3-carboxylic acid, 1,2,4-triazole-3-carboxyamide, 4-aminourazole, and 1,2,4-triazol-5-one, for example, 1,2,4 triazole or benzotriazole.

In the present disclosure, examples of the thiadiazoles include 2,5-dimercapto 1,3,4 thiadiazole, thiadiazole, 2-mercapto-5-hydrocarbylthio-1,3,5-thiadiazole, 2-Mercapto-5-hydrocarbyldithio-1,3,4-thiadiazole, 2,5-bis(hydrocarbylthio)-1,3,4-thiadiazole, 2,5-(bis)hydrocarbyldithio-1,3,4-thiadiazole, but is not limited thereto.

In the present disclosure, the azoles may be contained in an amount of 0.01 to 5.0% by weight, 0.01 to 4.0% by weight, 0.01 to 3.0% by weight, 0.01 to 2.0% by weight, 0.01 to 1.0% by weight, 0.01 to 0.5% by weight, to 5.0% by weight, 0.05 to 4.0% by weight, 0.05 to 3.0% by weight, 0.05 to 2.0% by weight, 0.05 to 1.0% by weight, 0.05 to 0.5% by weight, 0.1 to 5.0% by weight, 0.1 to 4.0% by weight, 0.1 to 3.0% by weight, 0.1 to 2.0% by weight, 0.1 to 1.0% by weight, 0.1 to 0.5% by weight, 0.15 to 5.0% by weight, 0.15 to 4.0% by weight, 0.15 to 3.0% by weight, 0.15 to 2.0% by weight, 0.15 to 1.0% by weight, to 0.5% by weight, 0.2 to 5.0% by weight, 0.2 to 4.0% by weight, 0.2 to 3.0% by weight, 0.2 to 2.0% by weight, to 1.0% by weight, or 0.2 to 0.5% by weight, for example, 0.25% by weight, based on the total weight of the composition, but with no limitations thereto.

In the present disclosure, the amino acid may be betaine, but is not limited thereto.

In the present disclosure, the amino acid may be contained in an amount of 0.01 to 5.0% by weight, 0.01 to 4.0% by weight, 0.01 to 3.0% by weight, 0.01 to 2.0% by weight, 0.01 to 1.0% by weight, 0.01 to 0.5% by weight, to 5.0% by weight, 0.05 to 4.0% by weight, 0.05 to 3.0% by weight, 0.05 to 2.0% by weight, 0.05 to 1.0% by weight, 0.05 to 0.5% by weight, 0.1 to 5.0% by weight, 0.1 to 4.0% by weight, 0.1 to 3.0% by weight, 0.1 to 2.0% by weight, 0.1 to 1.0% by weight, 0.1 to 0.5% by weight, 0.15 to 5.0% by weight, 0.15 to 4.0% by weight, 0.15 to 3.0% by weight, 0.15 to 2.0% by weight, 0.15 to 1.0% by weight, 0.15 to 0.5% by weight, 0.2 to 5.0% by weight, 0.2 to 4.0% by weight, 0.2 to 3.0% by weight, 0.2 to 2.0% by weight, 0.2 to 1.0% by weight, 0.2 to 0.5% by weight, for example, 0.25% by weight, based on the total weight of the composition, but with no limitations thereto.

In the present disclosure, the acetamide may be, for example, N,O-bis(trimethylsilyl)acetamide or N-trimethylsilylacetamide.

In the present disclosure, acetamide may be contained in an amount of 0.001 to 5.0% by weight, 0.001 to 4.0% by weight, 0.001 to 3.0% by weight, 0.001 to 2.0% by weight, 0.001 to 1.0% by weight, 0.001 to 0.5% by weight, 0.01 to 5.0% by weight, 0.01 to 4.0% by weight, 0.01 to 3.0% by weight, 0.01 to 2.0% by weight, 0.01 to 1.0% by weight, 0.01 to 0.5% by weight, 0.05 to 5.0% by weight, 0.05 to 4.0% by weight, 0.05 to 3.0% by weight, 0.05 to 2.0% by weight, 0.05 to 1.0% by weight, 0.05 to 0.5% by weight, 0.1 to 5.0% by weight, 0.1 to 4.0% by weight, 0.1 to 3.0% by weight, 0.1 to 2.0% by weight, 0.1 to 1.0% by weight, 0.1 to 0.5% by weight, 0.15 to 5.0% by weight, 0.15 to 4.0% by weight, 0.15 to 3.0% by weight, 0.15 to 2.0% by weight, 0.15 to 1.0% by weight, 0.15 to 0.5% by weight, 0.2 to 5.0% by weight, 0.2 to 4.0% by weight, 0.2 to 3.0% by weight, 0.2 to 2.0% by weight, 0.2 to 1.0% by weight, 0.2 to 0.5% by weight, for example, 0.25% by weight, based on the total weight of the composition, but with no limitations thereto.

In the present disclosure, when containing at least one selected from the group consisting of azoles, amino acids, and acetamide, the composition exhibits the same level of performance even if the content of anthranilamide is reduced, and there is also an effect of improving the performance, compared to the case where anthranilamide is not included.

Before and after being left at 60° C. for a long period of time (168 hours), the composition (100 g) of the present disclosure that is added with 3 g of aluminum powder may undergo a change in electrical conductivity up to six times, for example, up to five time, 4.5 times, 4 times, 3.5 times, 3.4 times, 3.3 times, 3.2 times, or 3.1 times.

Before and after being left at 60° C. for a long period of time (168 hours), the composition (100 g) of the present disclosure that is added with 3 g of aluminum powder may undergo a change in pH up to 20 times, for example, up to 18 times, 16 times, 14 times, 12 times, 10 times, 8 times, 6 times, 5.5 times, 5 times, 4.5 times, 4 times, 3.5 times, or 3 times.

After being left at 60° C. for a long period of time (168 hours), the composition (100 g) of the present disclosure that is added with 3 g of aluminum powder may produce an organic acid in an amount of 80 ppm or less, for example, 70 ppm or less, 60 ppm or less, 50 ppm or less, 45 ppm or less, or 40 ppm or less.

In the present disclosure, the organic acid may be glycolic acid and formic acid.

When the organic acid is glycolic acid, the composition (100 g) of the present disclosure added with 3 g of aluminum powder may produce glycolic acid in an amount of 70 ppm or less, for example, 60 ppm or less, 50 ppm or less, or 40 ppm or less after being left at 60° C. for a long period of time (168 hours).

When the organic acid is formic acid, the composition (100 g) of the present disclosure added with 3 g of aluminum powder may produce formic acid in an amount of less than 10 ppm, for example, 9 ppm or less, 8 ppm or less, 7 ppm or less, 6 ppm or less, or 5 ppm or less after being left at 60° C. for a long period of time (168 hours).

In the present disclosure, the heat transfer fluid composition may be for use in a hydrogen electric vehicle, but is not limited thereto.

Advantageous Effects

The present disclosure relates to a heat transfer fluid composition with improved thermal stability, and has an effect of suppressing the oxidation of a coolant provoked by hydrogen vehicle stack cooling system components and operating temperatures.

BEST MODE FOR CARRYING OUT THE INVENTION

Disclosed is a heat transfer fluid composition comprising at least one solvent selected from the group consisting of water, alcohols, glycols, and glycol ethers; and anthranilamide.

MODE FOR CARRYING OUT THE INVENTION

Below, a better understanding of the present disclosure may be obtained through the following examples, which are set forth to illustrate, but are not to be construed as limiting the present disclosure.

Preparation Example. Preparation of Coolant
Composition

Examples 1 to 6

Coolant compositions of various formulations for hydrogen electric vehicles were prepared as shown in Table 1 below. Ingredients and contents included in each composition are given in Table 1. Water and ethylene glycol were used as solvents. The contents given are expressed in % by weight for the solvents, but in parts by weight for ingredients other than the solvents, based on 100 parts by weight of the composition.

TABLE 1

| | Ex. 1 | Ex. 2 | Ex. 3 | Ex. 4 | Ex. 5 | Ex. 6 | C. Ex. 1 |
|---|---|---|---|---|---|---|---|
| Ethylene glycol | 49.5 | 49.975 | 49.85 | 49.85 | 49.85 | 49.85 | 50 |
| Deionized water | 49.5 | 49.975 | 49.85 | 49.85 | 49.85 | 49.85 | 50 |
| Anthranilamide | 1.0 | 0.05 | 0.05 | 0.05 | 0.05 | 0.05 | — |
| 1,2,4-Triazole | — | — | 0.25 | — | — | — | — |
| Benzotriazole | — | — | — | 0.25 | — | — | — |
| betaine | — | — | — | — | 0.25 | — | — |
| n,o(bistrimethy-silyl)acetamide | — | — | — | — | — | 0.25 | — |
| Sum | 100 | 100 | 100 | 100 | 100 | 100 | 100 |

Experimental Example 1. Evaluation for Thermal
Oxidation 1-1. Measurement of Rate of Change of Electrical Conductivity Each of the coolant compositions (100 g) prepared in the Preparation Examples was added with 3 g of aluminum powder and then left at 60° C. for a long period of time (168 hours). After removing the aluminum powder therefrom, the compositions were measured for electrical conductivity, and the measurements are summarized in Table 2.

TABLE 2

| | | Ex. 1 | Ex. 2 | Ex. 3 | Ex. 4 | Ex. 5 | Ex. 6 | C. Ex. 1 |
|---|---|---|---|---|---|---|---|---|
| Electrical conductivity | Pre-test | 1.02 | 0.503 | 0.715 | 0.821 | 0.812 | 0.911 | 0.155 |
| | Post-test | 3.14 | 2.14 | 2.18 | 2.41 | 2.43 | 2.65 | 1.01 |
| Change rate (fold) | | 3.08 | 4.25 | 3.05 | 2.94 | 2.99 | 2.91 | 6.52 |

As can be seen in Table 2, the electrical conductivity was increased about 6.5 times in the coolant composition of Comparative Example 1 and about 3 to 4 times in the coolant compositions of Examples 1 to 6. Thus, the coolant compositions of Examples 1 to 6 were observed to exhibit remarkably low increase rates of electrical conductivity, compared to that of Comparative Example 1.

1-2. pH Change Measurement

Each of the coolant compositions (100 g) prepared in the Preparation Examples was added with 3 g of aluminum powder and then left at 60° C. for a long period of time (168 hours). After removing the aluminum powder therefrom, the compositions were measured for pH, and the measurements are summarized in Table 3.

TABLE 3

| | Ex. 1 | Ex. 2 | Ex. 3 | Ex. 4 | Ex. 5 | Ex. 6 | C. Ex. 1 |
|---|---|---|---|---|---|---|---|
| Pre-test | 6.1 | 5.9 | 5.9 | 5.8 | 5.7 | 5.3 | 5.6 |
| Post-test | 5.6 | 5.2 | 5.4 | 5.3 | 5.1 | 4.9 | 4.3 |
| Change rate of proton concentration (fold) | 3.16 | 5.01 | 3.16 | 3.16 | 3.98 | 2.51 | 20.0 |

As can be seen in Table 3, proton concentrations changed up to about 5 times for Examples 1 to 6, but about 20 times for the Comparative Example. Thus, the coolant compositions of the Examples were observed to exhibit remarkably low change rates of proton concentrations, compared to that of the Comparative Example.

1-3. Measurement of Organic Acid Production

The organic acids (glycolic acid, formic acid, etc.) resulting from thermal oxidation of ethylene glycol shorten the life of the ion resin filter and speed up its exchange cycle. Accordingly, the organic acid production amount of each of the coolant compositions prepared in the Preparation Example was measured.

In brief, each coolant composition (100 g) prepared in the Preparation Example was added with 3 g of aluminum powder and then left at 60° C. for a long period of time (168 hours). Afterward, the amounts of the organic acids glycolic acid and formic acid were measured by IC analysis, and the measurements are summarized in Table 4, below (The amount of organic acids contained in the coolant compositions before the experiment was measured to be 0.)

TABLE 4

| ppm | Ex. 1 | Ex. 2 | Ex. 3 | Ex. 4 | Ex. 5 | Ex. 6 | C. Ex. 1 |
|---|---|---|---|---|---|---|---|
| Glycolic acid | 32 | 38 | 35 | 37 | 36 | 34 | 72 |
| Formic acid | — | 5 | 4 | 4 | 3 | 3 | 10 |
| Sum | 32 | 43 | 39 | 41 | 39 | 37 | 82 |

As can be seen in Table 4, glycolic acid was produced in an amount of 72 ppm in Comparative Example 1, but the amount was reduced by half to about 30 ppm in Examples 1 to 6. Formic acid was produced in an amount of 10 ppm in Comparative Example 1, but was detected to amount to up to 5 ppm or not detected at all in Examples 1 to 6. Thus, the coolant compositions of Examples 1 to 6 were observed to generate only a remarkably small amount of formic acid.

Experimental Example 2. Change in Electrical
Conductivity During Long-Term Storage When a fuel cell coolant is stored for a long time, electrical conductivity tends to increase. If the electrical conductivity goes up, the life of the stack and ion resin filter will be affected. Thus, even after a certain period of time, the electrical conductivity should be maintained at the level as in a fresh coolant.

Changes in electrical conductivity during long-term storage were examined according to additives. In brief, the electrical conductivity was measured after the product was placed in a PP container, sealed completely, and stored at room temperature (25° C.) for at 90, 180, 240, and 360 days, and the average rates of change were calculated according to the following equation, and the result is shown in Table 5.

$$\text{Average rate of change } (\%/\text{day})=[(Y2-Y1)/X]*100 \qquad [\text{Equation}]$$

X: Test period (days)
Y1: Electrical conductivity before test
Y2: Electrical conductivity after 360 days

TABLE 5

|  | Ex. 1 | Ex. 2 | Ex. 3 | Ex. 4 | Ex. 5 | Ex. 6 | C. Ex. 1 |
|---|---|---|---|---|---|---|---|
| Before test | 1.02 | 0.503 | 0.715 | 0.821 | 0.812 | 0.911 | 0.155 |
| 30 Days | 1.31 | 0.854 | 1.01 | 1.13 | 1.11 | 1.22 | 0.852 |
| 90 Days | 1.52 | 1.19 | 1.33 | 1.55 | 1.54 | 1.63 | 1.34 |
| 180 Days | 1.87 | 1.51 | 1.642 | 1.86 | 1.82 | 1.93 | 1.75 |
| 240 Days | 2.28 | 2.02 | 2.04 | 2.34 | 2.23 | 2.54 | 2.62 |
| 360 Days | 2.56 | 2.31 | 2.32 | 2.79 | 2.64 | 2.98 | 3.17 |
| Average rate of change (%/day) | 0.43 | 0.50 | 0.45 | 0.55 | 0.51 | 0.57 | 0.84 |

As can be seen in Table 5, Examples 1 to 6 were observed to undergo a change of 0.4 to 0.6% on average, which was remarkably low, compared to the average change rate of 0.84 in the Comparative Example, demonstrating that the composition of the present disclosure is thermally stable.

INDUSTRIAL APPLICABILITY

The present disclosure relates to a heat transfer fluid composition with improved thermal stability.

The invention claimed is:

1. A heat transfer fluid composition, comprising at least one solvent selected from water, alcohol, glycol, and glycol ether; anthranilamide; and a corrosion- and oxidation-resistant agent,
    wherein the corrosion- and oxidation-resistant agent is contained in an amount of 0.2 to 0.5% by weight, based on the weight of the composition,
    wherein the corrosion- and oxidation-resistant agent is betaine or N,O-bis(trimethylsilyl)acetamide.

2. The heat transfer fluid composition of claim 1, wherein the solvent comprises water and ethylene glycol.

3. The heat transfer fluid composition of claim 2, wherein the water is contained in an amount of 30 to 70% by weight, based on the total weight of the composition.

4. The heat transfer fluid composition of claim 2, wherein the ethylene glycol is contained in an amount of 30 to 70% by weight, based on the total weight of the composition.

5. The heat transfer fluid composition of claim 1, wherein the anthranilamide is contained in an amount of 0.001 to 5.0% by weight, based on the total weight of the composition.

6. The heat transfer fluid composition of claim 1, wherein the composition is a coolant composition for use in hydrogen electric vehicles.

* * * * *